United States Patent [19]

Hoover

[11] Patent Number: 4,631,715
[45] Date of Patent: Dec. 23, 1986

[54] AUDIO STRAW AND CUP LID

[76] Inventor: Lawrence E. Hoover, 8625 W. Vernor, Detroit, Mich. 48209

[21] Appl. No.: 731,049

[22] Filed: May 6, 1985

[51] Int. Cl.⁴ .................. G11B 1/04; G11B 3/00; G11B 7/24; A47G 21/18
[52] U.S. Cl. ..................... 369/68; 138/121; 206/217; 206/307; 446/397
[58] Field of Search .................. 369/68; 138/121; 446/397; 206/217, 307

[56] References Cited

U.S. PATENT DOCUMENTS 2,165,073  7/1939  Schwartz ........................ 446/397
2,287,377  6/1942  Gallier .......................... 369/68
3,462,157  8/1969  Barnett et al. ................... 369/68
4,121,835 10/1978  Garabedian ...................... 369/68

Primary Examiner—Steven L. Stephan
Attorney, Agent, or Firm—Hauke & Patalidis

[57] ABSTRACT

A beverage container lid made of relatively thin, flexible and sound resounding material, provided with cross-slits at its center with a sound reading member in the form of a sharp projection engageable with an in-depth recording soundtrack linearly embossed on the peripheral surface of a coacting drinking straw. By pushing the drinking straw through the cross-slits in the lid, the sharp projection engages the linear soundtrack on the straw thus causing the lid to vibrate and emit a sound corresponding to that recorded on the straw soundtrack.

4 Claims, 5 Drawing Figures

AUDIO STRAW AND CUP LID

BACKGROUND OF THE INVENTION

The present invention relates to a drinking straw and cup lid combination providing playback of a musical or verbal theme upon introduction of the straw into the cup through a slit in the lid.

In the fast-food business, beverages are often provided to the customer in a plastic, styrofoam or paper cup provided with a lid, made of thin plastic or cardboard. The lid is cross-slit at its center, and the end of a drinking straw is conveniently pushed through the slit in the lid to gain access to the beverage in the cup. It is also known to provide the drinking straw with peripheral serrations that causes a single musical note to be emitted upon introduction of the straw through the slit as a result of the tips of the cross-slit being set in vibration upon pushing the straw through the center of the cross-slit, the lid acting as a sound emitting resonant membrane.

SUMMARY OF THE INVENTION

The principal object of the present invention is to provide a musical or talking drinking straw and cup lid combination which upon introduction of the straw through a cross-slit in the lid causes a tune or a short sentence to be uttered. It is a further object of the invention to provide the slit cup lid and the drinking straw used in combination with the slit lid with a particular structure permitting the user to selectively play back one of a plurality of tunes or other sound recorded on the straw in the form of a plurality of sound tracks, with selective choice of the sound track being played back. This and other objects of the present invention will become apparent to those skilled in the art when the following description of the best mode of the invention contemplated at the present is read in conjunction with the accompanying drawing given for illustrative purpose only, and wherein:

DETAILED DESCRIPTION OF THE PREFERRED EMBODIMENT

Figure 1:
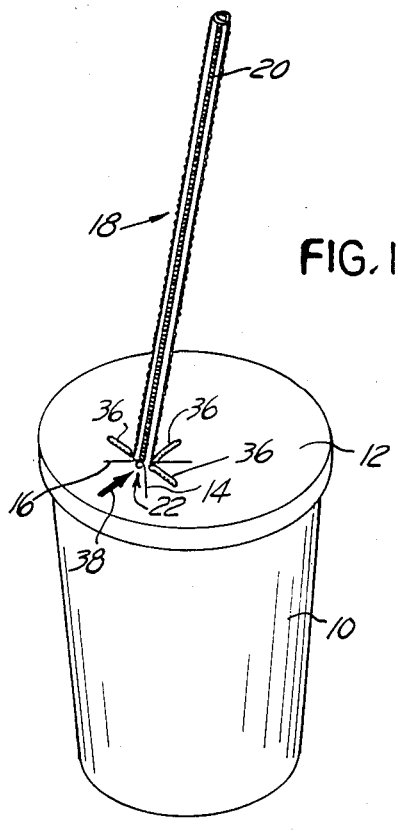
FIG. 1 is a perspective view of a beverage cup provided with a combination audio lid and drinking straw according to the present invention.

Referring to the drawing, and more particularly to FIG. 1, there is illustrated a beverage container in the form of a cup 10 made of styrofoam, plastic or cardboard, provided with a closure or lid 12 having a pair of cross-slits 14 and 16 disposed at right angle to each other and forming an X-shaped slit. A tubular drinking straw 18 is used for gaining access to the contents of the cup 10 without removing the lid 12 by placing the end of the straw substantially at the junction between the slits 14 and 16 pushing the straw 18 downwardly. As is well known, when the drinking straw 18 is pushed through the cross-slits 14 and 16, the four substantially sharp tips formed by the cross-slits 14 and 16 are resiliently deflected such as to provide an opening large enough to allow passage of the straw 18 therethrough.

Figure 2:
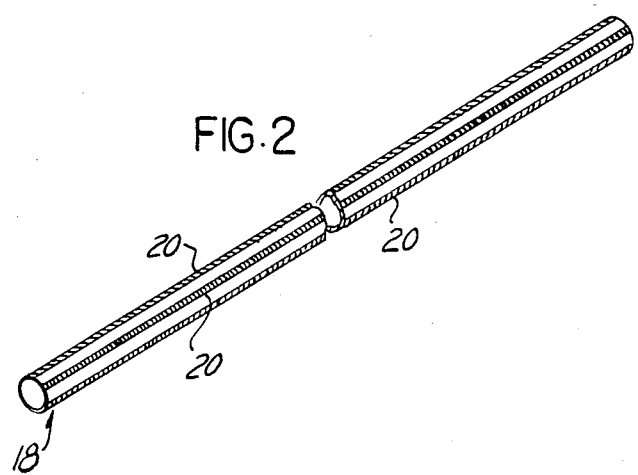
FIG. 2 is a perspective view of the straw.

According to the present invention, the drinking straw 18 is provided with one or more linear sound tracks 20, FIGS. 1 and 2, formed on the peripheral surface of the straw, and the lid 12, which is made of thin plastic or cardboard, is provided at the cross-slits 14 and 16 with a selective audio playback structure generally designated at 22.

Figure 3:
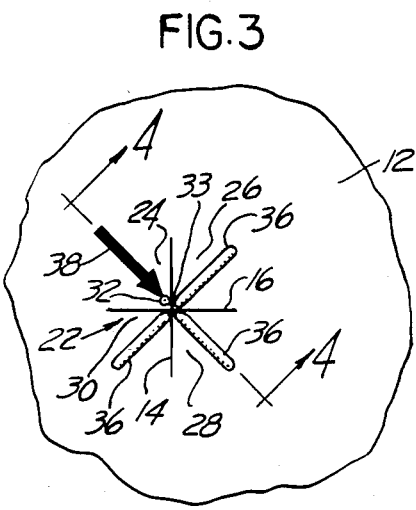
FIG. 3 is a partial top plan view of the lid.

As shown more particularly at FIG. 3, the cross-slits 14 and 16 circumscribe two full sides of four triangular flaps 24, 26, 28 and 30. One of the triangular flaps, for example triangular flap 24, has a conical projection 32 embossed in the lid material proximate the tip 33 of the flap 24 such that the tip or apex 34 of the conical embossed projection 32 projects above the top surface of the lid 12. In the example of structure illustrated, the three other flaps 26, 28 and 30 are each provided with an elongated smoothly rounded dimple 36, having an end extending to the tip 33 of the corresponding flap 26, 28 or 30.

Figure 5:
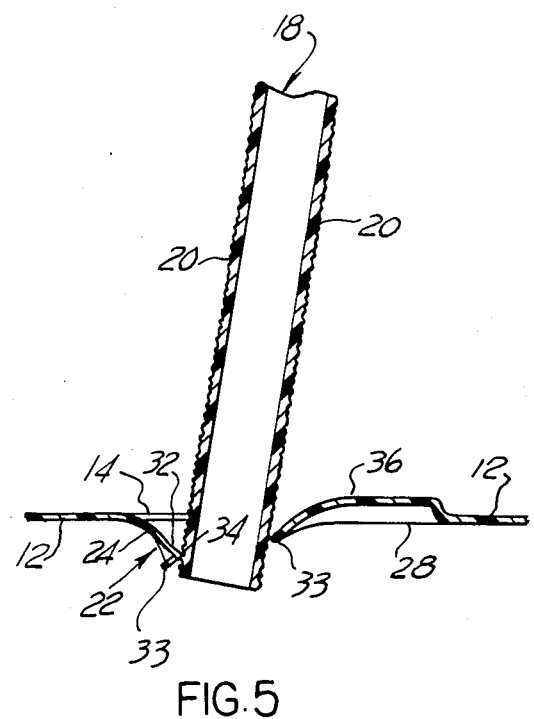
FIG. 5 is a view similar to FIG. 4 but showing the operation of the invention during introduction of a straw through the slit in the lid.
Figure 4:
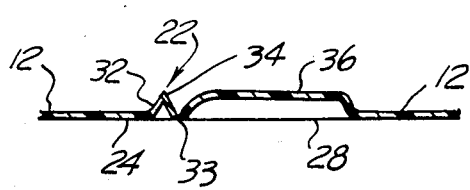
FIG. 4 is a schematic sectional view on line 4—4 of FIG. 3.

When the end of a drinking straw 18, according to the present invention, is pushed through the cross-slits 14-16 in the lid 12, the flap 24 is elastically bent downwardly, as shown at FIG. 5, thus causing the tip or apex 34 of the conical projection 32 to rub against the crests and valleys of one of the linear soundtracks 20 embossed on the surface of the straw 18, thus acting as the stylus or needle of a phonograph being set in vibration through engagement with the crests and valleys of a longitudinally in-depth modulated soundtrack groove. As is well known, conventional phonograph records have a soundtrack which is recorded laterally, or transversely to the axis of the groove, thus causing the stylus or needle to be set laterally in vibration. However, as it is also well known, soundtracks can be, and have been in the past, recorded in depth on phonograph records, thus setting the readback stylus in vibration longitudinally rather than laterally.

Each soundtrack 20 on the drinking straw 18 is preferably recorded in depth with an appropriate audio modulation in the form of crests or peaks and valleys and, when the drinking straw 18 is pushed through the cross-slits 14-16, engagement of the apex 34 of the conical projection 32, acting as a phonograph readback stylus, causes the conical projection or stylus 32 to vibrate and to transmit the vibration through the flap 24 to the lid 18 which acts as a drum-like sound amplifier, thus emitting an appropriate modulated sound in the form of a musical or spoken message. The message, musical or spoken, may take the form of an advertising message.

In structures wherein the drinking straw 18 is provided with several soundtracks 20, the lid 12 is preferably provided with an indexing marking, such as an arrow, for example, as shown at 38 at FIGS. 1 and 3, to enable the user to index one of the soundtracks 20 with the conical projection or stylus 32, to play back an appropriate one of the soundtracks 20. The flaps 26, 28, and 30, although they may be engaged at their tip 33 with soundtracks 20 other than the desired one, are prevented from vibrating according to the sound modulation embossed in the soundtracks, because the edge, proximate the flap tip 33, of the elongated dimples 36 is prevented from elastically engaging successive crests and valleys of the soundtrack, the rounded shape of the dimples 36 straddling consecutive peaks and being incapable of dropping in the valleys between peaks.

It will be appreciated by those skilled in the art that the drinking straw 18, provided with a soundtrack 20 properly indexed, must be pushed into the cup 10 through the cross-slits 14–16 in the cover or lid 12 at a relatively constant velocity and at the approximate speed at which the lid 12 is caused to emit a sound without undue distortion.

The drinking straw 18 may be made conventionally, for example from thin-walled extruded plastic tubing, cut to appropriate lengths, or from wrapped paper. When made of a length of plastic tubing, the straw 18 is provided with the soundtracks 20 by rolling over a die plate having parallel master soundtracks forming parallel imprints in the straw peripheral surface, a mandrel in the form of a steel rod, for example, being placed inside of the straw to apply rolling pressure to the straw. The imprinting, or embossing, of the soundtracks is facilitated by heating the straw to a temperature softening the plastic material. Alternatively, the straws, either made of plastic or wrapped paper, may be provided with a thin film of plastic wrapped around their periphery and adhered to their surface in any convenient manner, such as by bonding. The thin plastic film is provided with parallel soundtracks embossed thereon.

Having thus described the present invention by way of an example of structure well designed for accomplishing the objects of the invention, modifications thereof will be apparent to those skilled in the art, what is claimed as new is as follows:

1. The combination of a cup lid having a pair of cross-slits for allowing passage therethrough of a drinking straw, said cup lid being made of substantially thin resilient material, said drinking straw having at least one longitudinal linear soundtrack embossed on its surface, said soundtrack consisting of a series of embossed crests and valleys according to a specific audio modulation, said cross-slits on said lid forming a plurality of substantially triangular flaps having adjoining tips, one of said flaps having a stylus-like projection having a sharp apex formed at the tip of said one of said flaps for engagement with said soundtrack when said drinking straw is pushed through said cross-slits causing said one of said flaps having said stylus-like projection to bend and thereby engage the apex of said stylus-like projection with said soundtrack, whereby said lid is set in vibration for emitting a sound corresponding to said soundtrack on said drinking straw, wherein said drinking straw has a plurality of longitudinal linear soundtracks and means at the tip of the flaps other than said one of said flaps provided with said stylus-like projection preventing engagement of the tip of said other flaps with said soundtracks.

2. The combination of claim 1 wherein said means comprises a smooth rounded dimple formed in said other flaps proximate the tip of said other flaps.

3. The combination of claim 1 wherein said stylus-like projection is a conical projection embossed in said one of said flaps at the tip thereof.

4. The combination of claim 2 wherein said stylus-like projection is a conical projection embossed in said one of said flaps at the tip thereof.

* * * * *